Aug. 26, 1941. E. D. LILJA 2,253,524
REVERSIBLE MOTOR
Filed Aug. 19, 1938
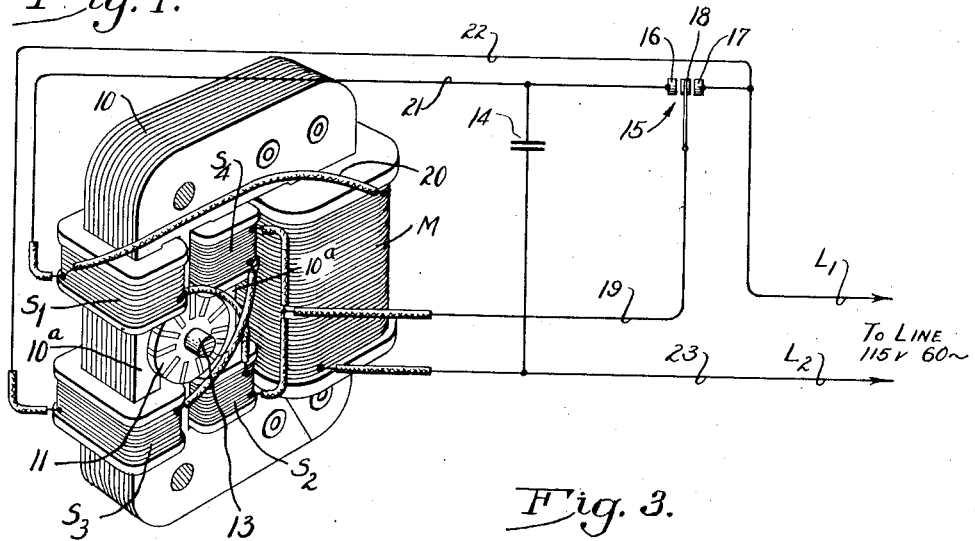
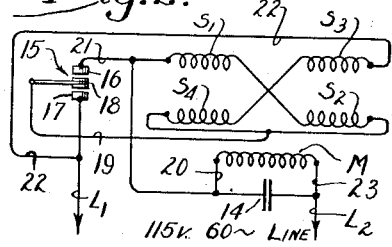
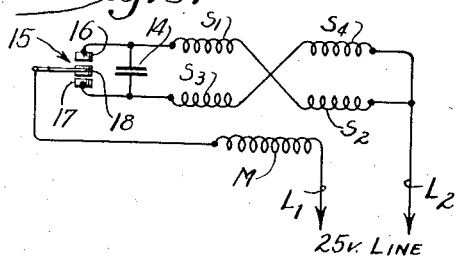
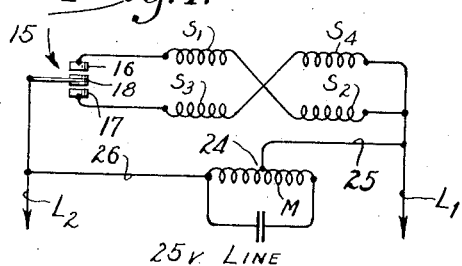
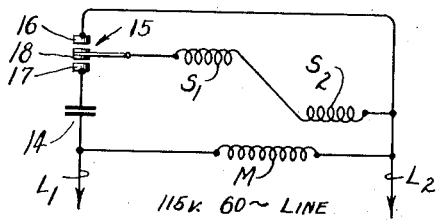
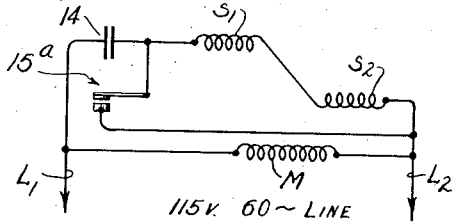
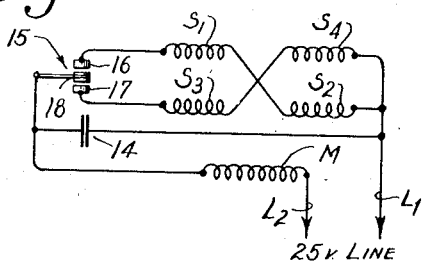
INVENTOR
Edgar D. Lilja
BY
Parker, Carlson, Pitzner & Hubbard
ATTORNEYS Patented Aug. 26, 1941

2,253,524

UNITED STATES PATENT OFFICE 2,253,524

REVERSIBLE MOTOR

Edgar D. Lilja, Rockford, Ill., assignor to Barber-Colman Company, Rockford, Ill., a corporation of Illinois Application August 19, 1938, Serial No. 225,761

10 Claims. (Cl. 172—278)

The invention relates to reversible single phase alternating current motors and more particularly to such motors of the shaded pole type. The term "shaded" and related terms as used herein are intended to embrace all motor constructions in which an auxiliary or supplemental winding, inductively coupled with the main field winding or windings, is used to produce a magnetic flux which is displaced in time phase from the main field flux, and the term or terms are not limited to include only such shading windings which are short-circuited.

The general object of the present invention is to provide a single phase alternating current shaded pole motor embodying an improved arrangement for obtaining effective reversing operation.

A more specific object of the invention is to provide a motor of the type described provided with a shading winding together with an associated condenser arranged in a novel manner to control the direction of rotation of the motor for reversing operation.

Another object of the invention is to provide a shaded pole motor which is reversible by means of a simple control switch mechanism and which furthermore has good torque characteristics while in operation as well as low stand-by losses when idle.

Further objects and advantages of the invention will become apparent as the following description proceeds taken in connection with the accompanying drawing, in which Figure 1 is a perspective view of a reversible shaded pole motor and the associated control circuits therefor, embodying the invention.

Fig. 2 is a wiring diagram of the apparatus of Fig. 1.

Figs. 3 to 7 inclusive are wiring diagrams, similar to Fig. 2, of various modified reversible shaded pole motor arrangements embodying the invention.

For purposes of illustration and explanation of its various novel features, the invention has been shown in Fig. 1 as embodied in a reversible shaded pole motor of the core type which is adapted to be operated from single phase alternating current supply lines $L_1$—$L_2$. It will be understood by those skilled in the art, however, that the invention is also applicable to shaded pole motors provided with a so-called shell type stator rather than a core type and that various other structural modifications or alternative constructions may be made. The particular construction shown in Fig. 1 is intended simply to be illustrative and there is no intention to limit the invention to such construction but, on the other hand, the appended claims are intended to cover all modifications within the spirit and scope of the invention.

The particular construction shown in Fig. 1 is generally similar in physical form to that of my earlier Patent No. 2,010,869 issued August 13, 1935, the present invention being concerned primarily with the circuit connections of the motor windings and associated parts. The motor shown embodies relatively rotatable primary and secondary members in the form of a stator 10 and a rotor 11. The stator 10 is made of a stack of superimposed laminations of suitably magnetizable material such as silicon steel. The main body portion of the core 10 is generally C-shaped and a main energizing winding M encircles the vertical leg of the C. The rotor 11 is disposed between the open ends of the C, which latter ends constitute in effect the two poles for the two-pole motor structure shown. In order to increase the motor torque, integral extensions or bridges 10$^a$ are fashioned on the core on each side of the rotor 11 so that the core structure embraces the rotor in closely spaced relation and entirely encircles the same.

The rotor 11 is of the conventional squirrel cage type and is carried by a rotor shaft 13 journaled in suitable bearings (not shown). The ratio of copper to iron in the rotor and shape of the rotor inductors may be varied in accordance with the particular efficiency and torque characteristics required.

In order to cause rotation of the rotor 13 in one direction or the other, two sets of shading windings $S_1$—$S_2$ and $S_3$—$S_4$ have been provided. Each of these shading windings embraces a portion of the stator core 10 in such manner that they are threaded by the magnetic flux set up by the main field winding M so that all of the shading windings are inductively coupled with the main winding. The windings $S_1$ and $S_2$ of one set and $S_3$ and $S_4$ of the other set are disposed on diametrically opposite sides of the rotor and enclose corresponding side sections of the opposite poles. Thus, the windings of the respective sets are arranged in alternating relation about the rotor periphery. In general, the shading windings set up a magnetic flux threading the rotor 11 and displaced in time phase with respect to the main flux of the field winding M, which also threads the rotor 11, and the shading windings are disposed in such geometrical position about the rotor periphery that the rotor will be subjected to the force of a magnetic field, which progressively increases and decreases in magnitude, in one direction or the other about its periphery so as to induce rotation of the rotor in such direction. With the shading coil arrangement so far described, it would be possible to cause rotation of the rotor 11 by energizing the main winding 11 and short-circuiting one or the other of the sets of shading windings $S_1$—$S_2$ or $S_3$—$S_4$ while open-circuiting the other set. Such operation is open to the objection, however, that the open-circuited shading windings simply constitute unused copper in the motor and, furthermore, the stand-by losses when the motor is idle are rather high since the main winding M would ordinarily be connected directly across the supply lines at all times.

In order to increase the torque of the motor described and also to minimize its stand-by losses, a condenser 14 is connected in parallel with the main winding M. Furthermore, a single-pole double-throw control switch 15, having fixed contacts 16—17 and a movable contact 18, is utilized for controlling the circuit connections of the motor windings and condenser in a particular manner. In the circuit for the motor of Fig. 1, the two sets of shading windings $S_1$—$S_2$ and $S_3$—$S_4$ are connected together at one end and to the center contact 18, of the control switch 15, by a conductor 19. The other end terminal of the set of shading windings $S_1$—$S_2$, as well as one terminal of the main winding M, are connected to the switch contact 16 through conductors 20 and 21 while the other end terminal of the set of shading windings $S_3$—$S_4$ is connected to the switch contact 17 by conductor 22. The supply line $L_1$ is also connected to the switch contact 17 while the other supply line $L_2$ is connected to the second terminal of the main winding M by a conductor 23.

With the circuit arrangement shown in Figs. 1 and 2, the motor is stopped by shifting the control switch 15 to its open or mid-position illustrated. When the switch is in such position, the main winding M and its parallel connected condenser 14 are connected in series with all of the shading windings across the supply lines $L_1$—$L_2$. By thus placing all of the shading windings in series with the main field winding, the impedance of the circuit in stand-by is increased so that the stand-by losses are very materially less than they would be in case the main winding M were connected alone directly across the supply lines. Furthermore, the connection of the condenser 14 in parallel with the main winding M also increases the impedance of the field winding circuit so as to further minimize the current drawn from the supply lines during stand-by.

During the operation of the motor shown in Figs. 1 and 2, rotation in a clockwise direction (as viewed in Fig. 1) is initiated by closing the contacts 17—18. The result of such contact closure is to short-circuit the shading windings $S_3$—$S_4$ while connecting the shading windings $S_1$—$S_2$ across the supply lines in series with the main winding M and its shunt connected condenser 14. When the motor is so connected, the shading windings $S_3$—$S_4$ operate in the manner of conventional short-circuited shading windings. In other words, a potential is induced in these short-circuited windings by the main field flux which threads them and this potential in turn sets up a lagging voltage in the shading windings themselves so that a secondary or shading flux is set up which lags in time phase behind that of the main field winding. The effect on the other set of shading windings $S_1$—$S_2$ is more complex. The potential which appears across the terminals of this set of windings is made up of several components, one of which is the voltage induced by the main field flux just as in the case of the other set of shading windings. In addition, there is a second component set up by the leading current supplied through the condenser 14 and which leads in time phase the main field flux. Accordingly, there is a lagging flux set up by the shading windings $S_3$—$S_4$ and a leading shading flux set up by the other set of shading windings $S_1$—$S_2$ so that a strong rotating magnetic field tending to rotate the rotor 11 results.

Rotation of the rotor 11 in the opposite or counter-clockwise direction (as viewed in Fig. 1) is accomplished in a similar manner by simply closing the switch contacts 16—18. Such contact closure, in effect, reverses the connections of the sets of shading windings or, in other words, the set of shading windings $S_1$—$S_2$ is now short-circuited and the other set $S_3$—$S_4$ connected in series with the main winding M and condenser 14. The net result is to set up a strong magnetic field rotating in the opposite direction from that described above.

Figs. 3 and 4 illustrate modifications of the arrangement shown in Figs. 1 and 2 in which only one set of shading windings $S_1$—$S_2$ is used rather than the two sets as previously described. The same reference numerals and letters have been used in Figs. 3 and 4, as well as in Figs. 5 to 7 inclusive, to indicate parts identical with those shown in Figs. 1 and 2. The capacity of the condenser or condensers may be somewhat different, of course, and in any event its value will depend upon the related characteristics of the motor circuit in which it is used. It will be understood that the general physical structure of the motor may, if desired, be the same as that shown in Fig. 1. The arrangements shown in Figs. 3 and 4 have the advantage that only half as many shading windings are required, and consequently, the initial cost of the motor is less than that for the motor of Fig. 1. On the other hand, the motor of Fig. 1 has somewhat better torque characteristics and materially lower stand-by losses. Referring particularly to Fig. 3, it will be seen that this motor is controlled by a single-pole double-throw switch 15 just as in the case of the motor of Fig. 1. In this instance, however, the main winding M is permanently connected across the supply lines $L_1$—$L_2$ and when the switch 15 is in its mid position shown, the shading windings $S_1$—$S_2$ are completely open-circuited to stop the motor. Rotation in one direction is achieved by short-circuiting the shading windings $S_1$—$S_2$ by closure of the switch contacts 16—18 so that the shading windings set up a magnetic flux which lags that of the main field winding. Similarly, rotation in the opposite direction is accomplished by connecting the shading windings $S_1$—$S_2$ across the supply lines $L_1$—$L_2$ in series with a condenser 14 so that the current flowing through the shading windings leads in time phase that which flows through the inductive main field winding M and, as a result, a leading rather than a lagging flux is set up by the shading windings.

In the arrangement of Fig. 4, a single-pole single-throw switch 15ᵃ is used to control the motor rather than a double-throw switch. In this circuit arrangement, reversal of rotation is, in general, also accomplished by alternatively short-circuiting the single set of shading windings or connecting them across the supply lines in series with a condenser 14 so that the flux set up by the shading windings either lags or leads the main field flux. In the present instance, however, a permanent connection is made between the condenser 14 and the shading coils $S_1$—$S_2$ so that when the switch 15ᵃ is opened as shown, the motor will be energized for rotation in one direction and when the switch 15ᵃ is closed, a shunt is completed about the shading windings to short-circuit them so that the motor will operate in the opposite direction. In neither position of the switch 15ᵃ is the motor stopped. A supplemental control switch (not shown) may, of course, be provided in the supply line to cut off all power to the motor when desired.

A modified circuit arrangement shown in Fig. 5 embodies two sets of shading windings $S_1$—$S_2$ and $S_3$—$S_4$ just as in the case of the motor in Fig. 1. The arrangement in Fig. 5 has the advantage that the motor is completely open-circuited when idle even though it is controlled by simple single-pole double-throw switch 15 and therefore has no standby loss whatever. Although it does have this lower stand-by loss as compared to the motor of Fig. 1, its torque characteristics are not quite so good. In the motor of Fig. 5, the two sets of shading windings are alternatively connected directly across the supply lines $L_1$—$L_2$ in series with the main winding M and in series with a condenser 14. In particular, when the switch contacts 16—18 are closed, a first set of shading windings $S_1$—$S_2$ is connected in series across the supply lines $L_1$—$L_2$ with the main winding M while the second set of shading windings $S_3$—$S_4$ is also connected in series with the main winding M but, in addition, in series with the condenser 14. Accordingly, the second set of shading windings $S_3$—$S_4$ draws a leading current and produces a flux which leads the flux set up by the main field winding M and the other set of shading windings $S_1$—$S_2$. The windings $S_1$—$S_2$ set up a flux which lags that of the main field winding although not to as great an extent as the case where they are short-circuited as in Fig. 1, since there is not only a lagging induced potential in the windings $S_1$—$S_2$, produced by the main field flux, but also an in-phase potential produced by the connection of these windings to the supply line in series with the main winding.

In order to cause rotation of the motor of Fig. 5 in the opposite direction, it is simply necessary to reverse the control switch 15, thereby closing the contacts 17—18. This reversal of the control switch reverses the status of the shading windings so that the set $S_1$—$S_2$ is then connected in series with the condenser 14 while the set $S_3$—$S_4$ is connected across the supply lines in series with the main field winding M. As a result, the motor is caused to rotate in the opposite direction.

In the modified motor circuits of Figs. 6 and 7, each of the motors embodies two sets of shading windings $S_1$—$S_2$ and $S_3$—$S_4$ and, furthermore, the motors are in each case controlled by a single-pole double-throw switch 15. In these circuit arrangements, only one set of shading windings operates at a time, however, the other set being open-circuited rather than being connected to the supply lines as in the case of Fig. 5 or short-circuited as in the case of Fig. 1. The phase of the current in the active set of shading windings is, however, modified by a condenser 14.

Referring more particularly to Fig. 6, the motor is stopped with the switch 15 in its open or mid position as shown, and in which position both sets of shading windings $S_1$—$S_2$ and $S_3$—$S_4$ are open-circuited. The losses at standby are low since the condenser 14 is connected across the supply lines $L_1$—$L_2$ in series with the main winding M.

To initiate rotation of the motor in Fig. 6 in one direction or the other the switch 15 is shifted correspondingly from its mid position to close its contacts 16—18 or 17—18. By closing these contacts 16—18 the shading windings $S_1$—$S_2$ are connected in circuit relation with the condenser 14, in the present instance in parallel with such condenser rather than in series with it as in Fig. 2, while the other set of shading windings $S_3$—$S_4$ in Fig. 6 remain open-circuited in such case. Similarly, by closing the contacts 17—18 the shading windings $S_3$—$S_4$ are energized while the other set of shading windings is open-circuited. Two components of voltage appear in the energized set of shading windings and both set up a current which causes a flux that lags in time phase behind the main field flux. One component of voltage in the energized shading windings is induced by the main field flux threading the shading windings. The other component is produced by the potential across the condenser 14. This latter potential across the condenser lags in time phase behind the current flowing through the condenser 14 and field winding M. Hence, the current and resulting flux set up in the set of shading windings, which is energized in the respective switching positions, lags behind the main field flux so that a strong magnetic field is produced for rotating the motor in one direction or the other, depending upon which set of shading windings is energized.

Turning now to the motor of Fig. 7 it will be seen that it embodies a main winding M having a center tap 24, which divides the winding into a plurality of sections. By connecting the center tap 24 to supply line $L_1$ through a conductor 25 and an end terminal of the main winding M to the supply line $L_2$ through a conductor 26, an auto-transformer connection for the main winding is established. In other words, the main winding is connected in the manner of a step-up auto-transformer with the line voltage between $L_1$—$L_2$ applied to its primary winding and a condenser 14 connected across its out-put terminals. As a result, the condenser 14 modifies the phase of the current flowing through the main winding M so that the latter draws a current which leads in time phase the current flowing through a winding connected directly across the supply lines $L_1$—$L_2$. The reversing switch 15 is arranged to connect the sets of shading windings $S_1$—$S_2$ and $S_3$—$S_4$ alternatively across the supply lines.

When the reversing switch 15 is in its open position illustrated, both sets of shading windings are open-circuited and the motor is thus stopped. In order to initiate rotation of the motor in one direction or the other, the reversing switch 15 is shifted correspondingly so as to close its contacts 16—18 or 17—18. The closure of the contacts 16—18 connects the shading windings $S_1$—$S_2$ directly across the supply lines $L_1$—$L_2$ while leaving the other set of shading windings open-circuited. In such case the current flowing through the main winding M leads the current flowing through the shading windings S₁—S₂, because of the effect of the condenser 14 noted above. In addition, the main field flux threading the shading windings S₁—S₂ induces a potential which causes a second component of current which also lags in time phase behind the current in the main winding M. Since both of the components of current flowing through the shading windings lag in time phase behind the field current they set up a strong secondary or shading flux which lags the main field flux with the net result that a strong rotating magnetic field is produced. Upon closure of the reversing contact 17—18 the reverse operation takes place in that the shading windings S₃—S₄ are energized while the other set is open-circuited. Again a flux is set up by the energized shading windings which lags in time phase behind the main field flux but the rotation of the motor takes place in the opposite direction since the shading windings S₃—S₄ are placed on the opposite portions of the pole pieces from the windings S₁—S₂.

With the arrangement shown in Fig. 7 the motor produces a strong torque in view of the double component of shading winding current and also because of the transformer action of the main winding which increases the circulating current through the main winding and condenser so that a strong main field flux is produced. At standby the losses are low, however, since the condenser 14 remains shunted across the main winding M and prevents the flow of a heavy current from the supply lines.

I claim as my invention:

1. A reversible single phase alternating current motor embodying a main winding and a shading winding inductively coupled with said main winding, characterized by the provision of a condenser operable to modify the phase of the current flowing through the shading winding with respect to the voltage applied to said main winding when said condenser is connected in circuit relation with said shading winding, together with a means including a reversing switch shiftable to at least two positions corresponding to opposite directions of rotation of the motor for establishing an energizing circuit for the motor from a source of current and including said condenser and said shading winding when in one switching position and for disabling said circuit against effecting further motor operation in the direction corresponding to said one switching position when in the other switching position.

2. A reversible single phase alternating current motor comprising, in combination, relatively rotatable primary and secondary members, a main energizing winding for said primary member, selectively operable means including a shading winding inductively coupled with said main winding for initiating rotation of said motor in one direction or the other, a condenser, and means for connecting said shading winding to a source of current with said condenser in circuit relation therewith only when said selectively operable means is conditioned for rotation of the motor in one direction.

3. A reversible single phase alternating current motor comprising, in combination, a stator and a rotor, a main winding and shading winding on said stator, said shading winding being inductively coupled with said main winding through said stator, a condenser, a reversing means for alternatively short-circuiting said shading winding or connecting the same to a source of current with said condenser in circuit relation therewith to cause rotation of the motor in either direction desired.

4. A reversible single phase alternating current motor comprising, in combination, a stator and a rotor, a main winding, at least two shading windings inductively coupled with said main winding, a condenser, and reversing means for alternatively short-circuiting one or the other of said shading windings and connecting the remaining shading winding to a source of current with said condenser in circuit relation therewith to cause rotation of the motor in either direction desired.

5. A reversible single phase alternating current motor comprising, in combination, a rotor and a stator, a main energizing winding and two sets of shading windings on said stator, the individual shading windings of said sets being disposed in alternating relation about the rotor periphery, a condenser connected in parallel relation with said main winding, and means including a single pole double throw switch for connecting said main winding to a source of current in series relation with both of said sets of shading windings when said switch is in its open position and for connecting alternate ones of said sets of shading windings to the source of current in series with said condenser and short-circuiting the remaining set when said switch is in its respective closed positions.

6. A reversible single phase alternating current motor comprising, in combination, a rotor and a stator, a main energizing winding on said stator, two sets of shading windings on said stator, a condenser connected in series relation between said sets of shading windings, and means including a single pole double throw switch for open-circuiting said main winding and said shading windings when said switch is in its open position and for alternatively connecting said sets of shading windings to a source of current independently of said condenser while connecting the remaining set of shading windings to the source of current in series relation with the condenser when said switch is in its respective closed positions.

7. A reversible single phase alternating current motor comprising, in combination, a rotor and a stator, a main energizing winding on said stator, at least two shading windings on said stator, a single pole double throw switch having two side contacts and a movable contact, said side contacts being connected to end terminals of respective ones of said shading windings, a condenser connected across said side contacts, and a two-terminal source of current, one of said current source terminals being connected to the remaining end terminals of said shading windings and the other current source terminal to one terminal of said main winding, the opposite end terminal of said main winding being connected to said movable switch contact.

8. A reversible single phase alternating current motor comprising, in combination, a stator and a rotor, at least two shading windings, a condenser, and reversing means for alternatively open-circuiting one or the other of said shading windings and establishing an energizing circuit for the remaining shading winding in which circuit said condenser modifies the phase relation of the currents in said main winding and the remaining shading winding to cause rotation of the motor in either direction desired.

9. A reversible single phase alternating current motor comprising, in combination, a rotor and a stator, a plural section main energizing winding on said stator, means for connecting said main winding to a source of current with the sections thereof connected as a step-up autotransformer, a condenser connected across the end terminals of said main winding, at least two shading windings on said stator inductively coupled with said main winding for causing rotation of the magnetic field in opposite directions around said rotor, and reversing means for alternatively connecting one or the other of said shading windings to the source of current while open-circuiting the remaining shading winding.

10. A reversible single phase alternating current motor comprising, in combination, relatively rotatable primary and secondary members, a main winding and a shading winding on said primary member and inductively coupled with each other, a condenser, and reversing means shiftable to at least two positions corresponding to opposite directions of rotation of said motor for establishing an effective energizing circuit from a source of current for said shading winding when in at least one of said two positions and for connecting said condenser in circuit relation with said shading winding in at least one of said two positions.

EDGAR D. LILJA.